United States Patent
Poulakis

(10) Patent No.: US 7,063,878 B1
(45) Date of Patent: Jun. 20, 2006

(54) PROCESS FOR PRODUCING FOAMED ARTICLES, ESPECIALLY FOAMED ARTICLES FOR UPHOLSTERING CAR SEATS

(75) Inventor: Konstantinos Poulakis, Pulsnitz (DE)

(73) Assignee: Gottlieb Binder GmbH & Co., Holzgerlingen (DE)

( * ) Notice: Subject to any disclaimer, the term of this patent is extended or adjusted under 35 U.S.C. 154(b) by 0 days.

(21) Appl. No.: 09/787,110

(22) PCT Filed: Sep. 28, 1998

(86) PCT No.: PCT/EP98/06141

§ 371 (c)(1),
(2), (4) Date: Mar. 14, 2001

(87) PCT Pub. No.: WO00/18556

PCT Pub. Date: Apr. 6, 2000

(51) Int. Cl.
*B29C 44/06* (2006.01)
*B32B 3/06* (2006.01)

(52) U.S. Cl. ...................... 428/100; 264/46.4; 264/276; 428/99

(58) Field of Classification Search ................ 428/99, 428/100, 308.4; 264/46.4, 276
See application file for complete search history.

(56) References Cited

U.S. PATENT DOCUMENTS

| 4,470,857 A | * | 9/1984 | Casalou ...................... 156/66 |
| 4,563,380 A | * | 1/1986 | Black et al. ................ 428/100 |
| 4,673,542 A | * | 6/1987 | Wigner et al. ............. 264/46.7 |
| 4,814,036 A | * | 3/1989 | Hatch ......................... 156/245 |
| 4,881,997 A | * | 11/1989 | Hatch ............................ 156/66 |
| 5,286,431 A | * | 2/1994 | Banfield et al. ............ 264/134 |
| 5,654,070 A | | 8/1997 | Billarant |

FOREIGN PATENT DOCUMENTS

WO    86 03164 A    6/1986

* cited by examiner

*Primary Examiner*—Allan R. Kuhns
(74) *Attorney, Agent, or Firm*—Roylance, Abrams, Berdo & Goodman L.L.P.

(57) ABSTRACT

A process produces foamed articles, especially foamed articles for upholstering car seats. The foamed articles include an adhesive closing part having adhesive elements incorporated into the foaming mold generating the foamed article and covered by a foam-protecting cover. The adhesive closing part itself constitutes the cover. A lateral cover of the adhesive closing part whose width overlaps the surface area on which the adhesive elements are arranged and is releasably attached to the foaming mold by a fixing device. This design simplifies the foaming process and keeps production costs low.

11 Claims, 1 Drawing Sheet

PROCESS FOR PRODUCING FOAMED ARTICLES, ESPECIALLY FOAMED ARTICLES FOR UPHOLSTERING CAR SEATS

FIELD OF THE INVENTION

The present invention relates to a process for producing a foam component, a foam upholstery component for a motor vehicle seat in particular. A component is provided with at least one adhesive sealing element containing adhesive elements covered by a foam retaining cover with ferromagnetic properties introduced into a foam injection mold producing the foam component. The cover is in the form of the adhesive sealing component itself, and is mounted with a variable-width edge cover projecting over the area having the adhesive elements. A retaining mechanism provides separable contact with the foam injection mold.

BACKGROUND OF THE INVENTION

Foam upholstery components with injected foam adhesive sealing elements are used by preference for foam upholstery components for seat elements, seat backs, or head restraints. Such elements are especially for motor vehicle seats, the adhesive elements of the injected foam adhesive sealing elements are generally used in this process for fastening cover materials provided with adhesive sealing components with suitable adhesive elements to mate with the foam upholstery component.

In order to ensure functional efficiency of the adhesive sealing elements, it is of essential importance to protect the adhesive elements from penetration by the foam material during the foam injection process by means of a foam retaining cover. Cementing of the adhesive elements is thereby prevented. This projection can be accomplished by employing a conventional process in such a way that the front side of the adhesive sealing element, on which the adhesive elements are exposed, is fully covered by a covering element in the form of a layer of a sealing compound. Sealing arrangement may be removed after the foam injection molding process in order to expose the adhesive elements again.

An adhesive sealing component disclosed in EP 0 612 485 A1 is a thermoplastic material which may be fused and reused after removal.

Despite use of a recyclable sealing compound, this procedure is very costly because of the additional operating steps for application of the sealing elements, removal, and the measures required for reuse.

A generic process is disclosed in U.S. Pat. No. 5,654,070. In this process for production of a foam component, the cover has two lengthwise ferromagnetic strips cemented onto the edge of the underside of the adhesive sealing element. The edge cover strips may then be brought in contact with the magnetic mechanism of the foam component such that foam-sealing adhesive elements may be appointed in a recess of the foam injection mold. To ensure that the adhesive sealing element does not separate from the foam injection mold during the foam injection process, ferromagnetic retaining clips in addition are arranged at variable length from each other gripping the approximate center of the adhesive sealing element, such that it combines its action with an additional retaining magnet of the foam injection mold arranged below the recess. Based on the high degree of cleanliness required during foam injection, the foam injection mold itself is to be cleaned after a predetermined number of foam injection processes. Cleaning of the recess within the foam injection mold, based on it being recessed form the otherwise flush surface is time-consuming and consequently very costly, because the foam injection mold is not immediately available for reuse in the production process.

A comparable process is disclosed in WO-A-86/03164. A magnetic strip used as a ferromagnetic adhesive element is ultrasonically fused into an adhesive seal constructed of multiple layers. When this adhesive sealing element is arranged in a recess within the foam injection mold, the metal strip is held by the magnetic and retaining mechanisms arranged in the center of the recess. The adhesive sealing element with its edge cover is supported on each side of the mold recess in the foam injection mold on the top surface in the wall of the mold, and is supported and projects over this top surface in the wall of the mold. The actual sealing elements of the adhesive seating element, which are to be kept free of foam material to ensure later trouble-free contact with the corresponding material of the adhesive sealing element of the upholstery material or the like, are arranged within the recess. The loop elements on the back of the adhesive sealing element extend all the way through to allow improved contact of the foam material, and concomitantly improved hold of the adhesive sealing element with the foam component to be produced. The increased cleaning requirements of this solution is disadvantageous as well with respect to the recess provided in the foam injection mold.

SUMMARY OF THE INVENTION

Based on this state of the art, the present invention is intended to develop a process which permits relatively simpler and more cost-effective production of foam components with injection-molded adhesive elements.

For the present invention, this problem is solved by a process where the adhesive elements are mounted in one plane with the edge cover of the adhesive sealing component in contact with the foam injection mold and the ferromagnetic components are constructed as integrated parts of the adhesive sealing element or are applied as layers on the front and/or back of the adhesive sealing elements. This arrangement permits construction of the foam injection mold without a recess, because the adhesive elements are contact-mounted in one plane of the foam injection mold with the edge cover of the adhesive sealing element. When cleaning the foam injection mold, there is no need for the costly cleaning of the mold recesses at all. The foam injection mold is promptly available for the actual production process. Since the ferromagnetic components, even in the shape of applied layers, widen the adhesive sealing element only minimally, the edge cover also structurally builds up minimally and permits direct contact with the retaining elements of the foam injection mold generating magnetic fields.

Additional advantageous embodiments are disclosed.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

The adhesive sealing component 1, shown in the figures, is for the foam injection production of upholstered parts of motor vehicle seats (not shown). The strip-type adhesive sealing component or adhesive closing part 1, but also one which may have a different two-dimensional geometry, has on one side adhesive or adhering elements 2 for joining to corresponding adhesive elements or adhering of another adhesive sealing component (not shown) to form a conventional adhesive seal or connection. In this way cushions and cushion upholstering materials may then be separably secured in position on the foamed motor vehicle seat by way of the respective adhesive seal or connection.

Figure 1:
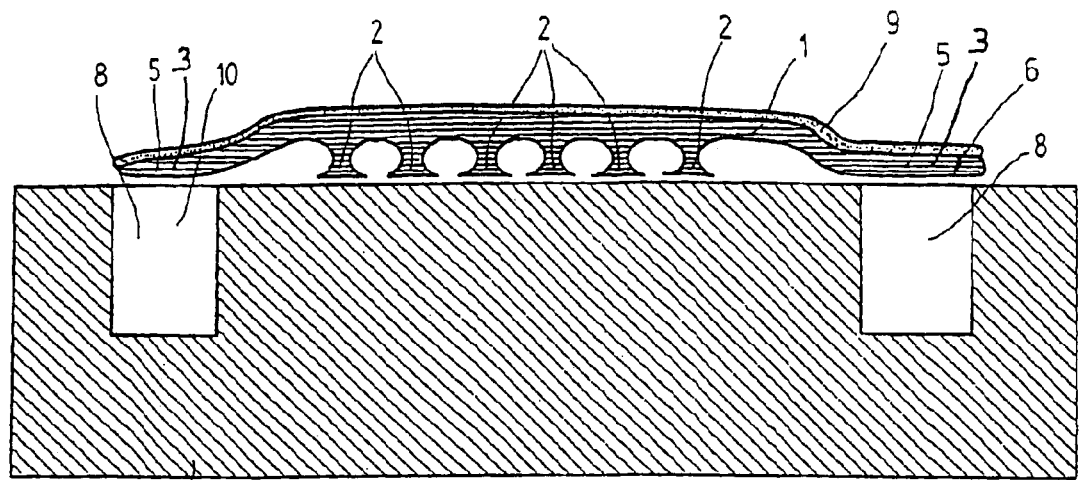
FIG. 1 is a side elevational view in section of a foam injection mold with an adhesive sealing component according to a first embodiment of the present invention.
Figure 2:
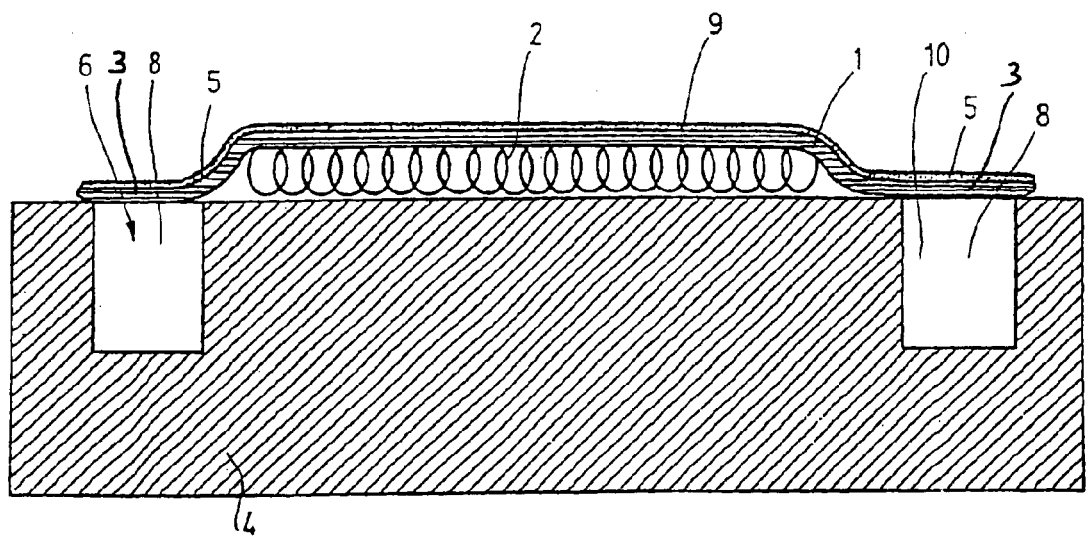
FIG. 2 is a side elevational view in section of a foam injection mold with an adhesive sealing component according to a second embodiment of the present invention.

The adhesive sealing component 1 shown in the figures is produced by a conventional process, such as one specified in DE 196 46 318.1. The adhesive elements 2, according to FIG. 1 shown in the form of mushroom-like stalks, the free ends of which spread out in the form of plates. The adhesive or adhering elements 2 may, however, also be, as is illustrated in FIG. 2, conventionally produced loops for engaging hook-shaped adhesive elements (not shown) of the corresponding adhesive sealing component to produce an adhesive seal or connection.

As the figures also show, the particular adhesive sealing component 1, with its adhesive elements 2 covered by a foam restraining cover 3 is received in a foam injection mold 4 producing the foamed component (not shown). The mold, of which only more or less one-half is shown in the figures, is part of a molding box. For the present invention, the cover 3 is in the form of the adhesive sealing component 1 itself. Cover 3 is mounted to extend, together with a variable-width edge cover or edge portions 5, to form a sealing surface over the surface area having the adhesive elements 2, and is brought, together with a retaining mechanism identified as a whole as 6, into separable contact with the foam injection mold 4.

As is to be seen from the figures, the adhesive elements 2 are mounted in one plane with the edge cover 5 of the adhesive sealing component 1 in contact with the foam injection mold 4 so that the surface area with the adhesive elements 2 curves upward as viewed in the line of sight to the figures. The planes in question relate to the frontal contact surface of adhesive sealing components 1 with their adhesive elements 2.

At the minimum, the edge cover 5 of the adhesive sealing component 1, but preferably the entire width and length of the adhesive sealing component, have ferromagnetic components. The ferromagnetic components are used as one part of the retaining mechanism 6. The other part of the retaining mechanism is part of the foam injection mold 4, and is in the form of retaining elements 8 mounted on it to generate a magnetic field. The edge cover 5 is retained by retaining elements 8 during the foam injection process to form a foam barrier or sealing lip. The edge cover 5 is made up, at the minimum, of two lengthwise edges of the adhesive sealing component 1 which are free of the adhesive elements 2 and which are provided with a surface area having adhesive elements 2 between the edge portions free of adhesive elements. Preferably, however, the edge cover 5, entirely rectangular in shape, encloses the surface area with adhesive elements 2 in all directions.

The ferromagnetic components of the present invention may be applied as an integral part of the adhesive sealing component or as layers applied to the front and/or back of the component The coating in question is preferably obtained by a sol-gel process or from an adhesive base material.

A sol-gel process suitable for production of adhesive sealing components 1 is described in PCT/EP 98/03055. The layer 9 obtained by way of the sol-gel process has a nanocompository structure, the sol-gel based on $SiO_2$ and/or $TiO_2$ modified $SiO_2$ being selected. In order for the layer 9 in question to possess ferromagnetic properties, the sol-gel is mixed with ferrite or a material containing ferrite with the structure $Fe_x O_y$. Magnetite may also be precipitated to obtain a ferromagnetic sol-gel. The layer 9 may be applied by padding, dipping, spraying, perfusion, vacuum metallizing, lamination, or wiping and pasting on the adhesive sealing component 1.

The layer 9 in question may, however, also comprise an adhesive base material of resorcin and/or at least one of its derivatives. In particular the layer of an adhesive base material may be a polyurethane layer containing a ferromagnetic, the polyurethane being, for example, the polyurethane SU 9182 made by the Stahl company. A suitable adhesive base is described in PTC/EP98/02886.

The retaining elements 8 of the foam injection mold 4 generating the magnetic fields are in the form of permanent magnets, for example ones in the form of magnetic strips 10 or bar magnets (not shown) introduced into the foam injection mold 4 or parts of the latter (pipes). The magnetic force of the retaining elements 8 used holds the adhesive sealing components with their ferromagnetic properties or layers of them used for the purpose together in firm contact and in position inside the foam injection mold 4 during the foam injection process. The relevant cover 3 forms a sealing surface or foam barrier in the area of the relevant edge cover 5 reliably, preventing harmful penetration of the foam material into the adhesive elements 2. This dispenses with the need for any coverings on the back of the adhesive sealing component 1 or ones in the form of a sealing compound used directly for the adhesive elements 2. As seen from the figures, the edge coverings 5 end in the area of the magnetic strips 10 or they extend beyond this area to form an extended seating length. The layers 9 may in addition improve the foam injection process so that reliable injection of the adhesive sealing component 1 into the polyurethane foam material of the vehicle upholstery element is ensured, especially if the layers 9 are applied to the back of the relevant adhesive sealing component 1 facing away from the injection mold 4.

The adhesive sealing component 1 comprises in particular of a polyamide or of a polyolefin material. In the case of the conventional production process described in DE 196 46 318 A1, in production of the adhesive sealing component 1 with its plurality of one-piece adhesive elements 2 in the form of stalks with thickened areas, a thermoplastic material in plastic or liquid state is delivered to a gap between a press roller and a section roller. The section roller is provided with cavities opening outward and inward. Both rollers are driven in opposite directions. The section roller has a screen with openings produced by etching or by means of a laser. The adhesive sealing elements result exclusively from the circumstance that the thermoplastic material hardens in the openings in the screen. The thickened areas of the individual stalks in question are in the form of mushroom heads, flattened or having concave recesses.

Other state-of-the-art processes may be employed to produce loops as adhesive elements 2 as illustrated in FIG.

2. In any event, the section rolling process may produce very small individual adhesive elements 2, whose size may fall entirely in the nanometer range. In place of the plastic material, the adhesive sealing component 1 may also be made of textile or other plastic materials, for example by applying conventional knitting techniques. Should these materials have to be provided with ferromagnetic coatings a sealing foam barrier may also be obtained. After the foam injection process has been completed, the foamed part, an upholstery element in particular, along with the injected foam adhesive sealing component 1 in it, can be immediately removed from the foam injection mold 4 by overcoming the retaining forces of the retaining elements 8 installed in the foam injection mold. The foam injection mold 4 is then available for repetition of the foam injection process. The adhesive elements 2 of the injected-foam adhesive sealing component 1 are then in any event free in the direction of the environment and contain no foam material which might impair their functional efficiency.

In sealing by means of the adhesive sealing component 1 itself form the foam material, no additional materials or additional sealing elements, such as added sealing lips or the like, are required. Sealing is accomplished exclusively by plane-parallel contact of the adhesive sealing strip with corresponding contact surfaces of the foam injection mold. The edge cover 5 of the adhesive sealing component 1 which effects sealing may be in the form of a foil or at least very thin sheet material.

While various embodiments have been chosen to illustrate the invention, it will be understood by those skilled in the art that various changes and modifications can be made therein without departing from the scope of the invention as defined in the appended claims.

What is claimed is:

1. A process for producing a foamed part having at least one adhesive closing part with adhesive elements, comprising the steps of:
    forming a one-piece, unitary adhesive closing part including a base with adhesive elements extending in a first direction from one surface thereof, said base having variable width edge portions free of adhesive elements such that said base forms a foam retaining cover projecting laterally beyond an area of the base supporting the adhesive elements, the cover having ferromagnetic components formed as an integral part thereof;
    placing the adhesive closing part in a foam injection mold such that free ends of the adhesive elements are arranged substantially in one plane, substantially perpendicular to the first direction and substantially parallel to the one surface at the base, with the edge portions of the adhesive closing part and in separable contact with the foam injection mold, the adhesive closing part being releasably retained in place in the foam injection mold by a retaining mechanism; and
    injecting molding material into the mold to produce the foamed part.

2. A process according to claim 1 wherein
the ferromagnetic components are embedded in the cover.

3. A process according to claim 1 wherein
the ferromagnetic components are in a layer applied to a surface of the adhesive closing part.

4. A process according to claim 1 wherein
the ferromagnetic components are at the edge portions and cooperate with retaining elements in the foam injection mold generating magnetic fields to hold the edge portions during a foam injection process to form a foam barrier.

5. A process according to claim 1 wherein
the edge portions extend along two lengthwise edges of the adhesive closing part, the adhesive closing part having the adhesive elements between the edge portions.

6. A process according to claim 3 wherein
the layer is formed by a sol-gel process.

7. A process according to claim 3 wherein
the layer has an adhesive base material.

8. A process according to claim 4 wherein
the retaining elements are permanent magnets in the form of magnetic strips or bars.

9. A process according to claim 1 wherein
the adhesive closing part is formed of a polyamide or a polyolefin material or is at least in part of textile materials.

10. A process according to claim 1 wherein
the adhesive closing part is placed in the foam injection mold such that the free ends of the adhesive elements and the edge portions of the adhesive closing part substantially contact a substantially planar surface of the foam injection mold.

11. An adhesive closing part for use in a process for producing a foamed part with the adhesive closing part thereon, comprising:
    a cover having edge portions and ferromagnetic properties as an integral part thereof, said edge portions having a mold engaging surface on a first side of said cover; and
    adhesive elements extending directly from said first side of said cover in a first direction between said edge portions, said edge portions being free of said adhesive elements, said adhesive elements having free ends substantially coplanar with said mold engaging surface of said edge portions of said cover in a plane substantially perpendicular to said first direction and substantially parallel to said first side, said adhesive elements being formed unitarily as one piece with said cover.

* * * * *